United States Patent
Rink et al.

(10) Patent No.: US 6,254,129 B1
(45) Date of Patent: Jul. 3, 2001

(54) ARRANGEMENTS AND METHODS FOR INFLATABLE DEVICE FORMATION OF INFLATION GAS

(75) Inventors: Karl K. Rink, Liberty; David J. Green, Brigham City; Michael J. Ward, Liberty, all of UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/632,022

(22) Filed: Aug. 2, 2000

Related U.S. Application Data

(62) Division of application No. 09/139,483, filed on Aug. 25, 1998, now Pat. No. 6,129,380.

(51) Int. Cl.[7] .................................................. B60R 21/26
(52) U.S. Cl. ........................ 280/736; 280/735; 280/742
(58) Field of Search ..................................... 280/737, 741, 280/735, 736, 728.1, 730.1, 730.2, 742, 743.1; 422/164, 166

(56) References Cited

U.S. PATENT DOCUMENTS

| | | |
|---|---|---|
| 3,425,712 | 2/1969 | Berryman . |
| 3,724,870 | 4/1973 | Kurokawa et al. . |
| 3,927,901 | 12/1975 | Weman . |
| 5,066,039 | 11/1991 | Shitanoki et al. . |
| 5,273,313 | 12/1993 | Klober et al. . |
| 5,348,344 | 9/1994 | Blumenthal et al. . |
| 5,423,570 | 6/1995 | Kort et al. . |
| 5,433,476 | 7/1995 | Materna et al. . |
| 5,470,104 | 11/1995 | Smith et al. . |
| 5,494,312 | 2/1996 | Rink . |
| 5,531,473 | 7/1996 | Rink et al. . |
| 5,556,128 * | 9/1996 | Sinnhuber et al. ............... 280/730.2 |
| 5,571,988 | 11/1996 | Hagel et al. . |
| 5,642,905 | 7/1997 | Honda . |
| 5,669,629 | 9/1997 | Rink . |
| 5,713,595 | 2/1998 | Mooney et al. . |
| 5,820,161 * | 10/1998 | Svensson ............................. 280/737 |
| 5,964,479 | 10/1999 | Rink et al. . |
| 5,979,936 | 11/1999 | Moore et al. . |
| 5,992,881 | 11/1999 | Faigle . |

FOREIGN PATENT DOCUMENTS

| | | |
|---|---|---|
| 2297950 | 8/1996 | (GB) . |
| 96/10496 | 4/1996 | (WO) . |

* cited by examiner

Primary Examiner—J. J. Swann
Assistant Examiner—F. Zeender
(74) Attorney, Agent, or Firm—Sally J. Brown

(57) ABSTRACT

Inflatable device inflation assemblies wherein a gas source material is released from an inflator apparatus into an inflatable device wherein the gas source material may, such as upon actuation of an initiator device situated within the inflatable device, dissociate or otherwise form gaseous products for the inflation of the inflatable device. An inflatable restraint system is also provided which includes a plurality of inflatable devices each operatively joined with a chamber which contains a dissociative gas source material. The system includes at least one first initiator effective upon actuation to initiate dissociation of the gas source material within a selected one of the plurality of inflatable devices. A method for inflating an inflatable device is also provided wherein a quantity of at least one gas source material is released into the inflatable device and which gas source material, when initiated, undergoes dissociation to form dissociation products including at least one gaseous dissociation product.

23 Claims, 6 Drawing Sheets

ARRANGEMENTS AND METHODS FOR INFLATABLE DEVICE FORMATION OF INFLATION GAS

CROSS REFERENCE TO RELATED APPLICATIONS

This application is a divisional of patent application Ser. No. 09/139,483, filed on Aug. 25, 1998, now U.S. Pat. No. 6,129,380.

The subject matter of this application is also related to prior U.S. patent applications Ser. No. 09/005,274, filed on Jan. 9, 1998; Ser. No. 08/935,014, filed on Sep. 22, 1997; and Serial No. 08/632,698, filed on Apr. 15, 1996, now Rink, U.S. Pat. No. 5,669,629, issued Sep. 23, 1997. The disclosure of each of these prior patent applications is hereby incorporated by reference herein and made a part hereof, including but not limited to those portions which specifically appear hereinafter.

BACKGROUND OF THE INVENTION

This invention relates generally to inflatable restraint systems and, more particularly, to arrangements and methods involving inflatable device formation of inflation gas.

It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins to be inflated in a matter of no more than a few milliseconds with gas produced or supplied by a device commonly referred to as an "inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings, a new type of inflator, called a "fluid fueled inflator," has been developed. Such inflators are the subject of commonly assigned Smith et al., U.S. Pat. No. 5,470,104, issued Nov. 28, 1995; Rink. U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such inflator devices typically utilize a fuel material in the form of a fluid, e.g. in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

While such an inflator can successfully overcome, at least in part, some of the problems commonly associated with the above-identified prior types of inflator devices, there is a continuing need and demand for further improvements in safety, simplicity, effectiveness, economy and reliability in the apparatus and techniques used for inflating an inflatable device such as an airbag cushion.

To that end, the above-identified Rink, U.S. Pat. No. 5,669,629 discloses a new type of inflator wherein a gas source material undergoes decomposition or dissociation to form products including at least one gaseous product used to inflate an inflatable device. As disclosed in Rink, U.S. Pat. No. 5,669,629, a pyrotechnic load-containing initiator device or heat source can be actuated to commence dissociation or decomposition of the gas source material.

Such an inflator can be helpful in one or more of the following respects: reduction or minimization of concerns regarding the handling of content materials; production of relatively low temperature, non-harmful inflation gases; reduction or minimization of size and space requirements and avoidance or minimization of the risks or dangers of the gas producing or forming materials undergoing degradation (thermal or otherwise) over time as the inflator awaits activation.

In view of possibly varying operating conditions and, in turn, possibly varying desired performance characteristics, there is a need and a desire to provide what has been termed an "adaptive" inflatable restraint system. With an adaptive inflatable restraint system, one or more parameters such as the quantity, supply, and rate of supply of inflation gas, for example, can be selectively and appropriately varied dependent on one or more selected operating conditions such as ambient temperature, occupant presence, seat belt usage and rate of deceleration of the motor vehicle, for example.

While such adaptive systems are desirable, they typically require the inclusion of additional components either in the system or as a part of the associated inflator device itself. Such inclusion of one or more additional components may undesirably increase the size, cost and/or weight of the inflator device or associated system. For example, various proposed or currently available dual stage inflator devices, particularly pyrotechnic-based forms thereof, appear based on the principal of packaging together two separate inflators. As a result, such inflator combinations commonly include two distinct pressure vessels, two sets of filter or inflation gas treatment components, one for the output of each of the pressure vessels, and two distinct diffusers, again one for the output of each of the pressure vessels. Thus, it has been difficult to provide an adaptive inflator which will satisfactorily meet the size, cost and weight limitations associated with modern vehicle design.

Stored or compressed gas-based adaptive inflation systems may overcome or at least minimize certain of such disadvantages. For example, such corresponding inflator devices may contain or utilize a single or "common" gas storage chamber for the provision of two or, possibly, more levels of performance or inflation pressures such as by selectively heating the stored gas to selected higher levels of pressure. Nevertheless, there is a need and demand for even more flexible inflation systems such as may capably provide an even wider array of selectable performance options.

"Rise rate," i.e., the rate at which the gas output from an inflator increases pressure as measured when such gas output is directed into a closed volume, is a common vehicular airbag inflator performance parameter used in the design, selection and evaluation of an inflator for particular airbag restraint system installations. For example, under certain circumstances such as in the event of a collision of relatively low severity or in connection with the protection of an out-of-position occupant or at least certain occupants of relatively smaller size including, for example, young children, it may be desirable for the corresponding inflatable restraint airbag cushion to deploy more gradually e.g., the rise rate for the associated inflator device is less steep, i.e., more gradual or gentler.

Further, while airbag cushions were initially commonly installed in vehicles to provide occupant protection primarily in the case of a frontal collision, modern vehicle design has placed increased reliance on inflatable airbag cushions to provide protection from other forms of collision including side impact collisions and vehicle rollovers. At least partially as a result thereof, side impact and other associated airbag assemblies have or are becoming more common in modern vehicles. For example, the possible desirable inclusion of an airbag cushion which upon inflation takes or assumes a tubular or other selected form and such as may form a covering, sometimes referred to as a "curtain" and such as may serve to cover a side, front or rear vehicle window, for example, has become increasingly apparent.

With the trend towards the inclusion of a greater number and variety of inflatable safety devices in modern vehicle design however, there is a desire and a growing apparent need for inflation system simplification such as may avoid the need for dedicated inflator devices for each such inflatable device and the costs associated with the design, manufacture, installation and maintenance of each such dedicated inflator device.

There remains a continuing need and demand for further improvements in safety simplicity, effectiveness, economy and reliability in the apparatus and techniques used for inflating inflatable restraints such as airbag cushions. More specifically, there is a need and a demand for improvements in inflatable restraint systems such as may provide or result in increased or greater flexibility of operation such as may better permit particular inflatable restraint systems to either or both:

1) be better tailored or adapted for use in specific or particular vehicle designs or 2) better provide or result in safe, simple, effective, economical, and/or reliable occupant protection to various vehicle occupants under an even greater variety of circumstances or conditions.

Further, there is a need and demand for inflatable restraint system design such as may more safely, simply, effectively, economically and/or reliably permit or allow inflation of multiple inflatable restraints such as airbag cushions as are more and more commonly being incorporated in modern vehicle design such as to provide increased or improve occupant protection.

SUMMARY OF THE INVENTION

A general object of the invention is to provide improved inflatable device inflation assemblies, systems or the like and improved methods of inflating inflatable devices.

A more specific objective of the invention is to overcome one or more of the problems described above.

The general object of the invention can be attained, at least in part, through a combination of an inflator apparatus having a chamber which contains contents including at least one gas source material which, when initiated, dissociates to form dissociation products including at least one gaseous dissociation product. The combination also includes opening means actuatable to open the chamber whereby at least a portion of the at least one gas source material can be expelled from the inflator apparatus.

The combination further includes an inflatable device and an initiator. The inflatable device is operatively joined with the inflator apparatus whereby, upon opening of the chamber, at least a portion of the at least one gas source material expelled from the inflator apparatus is passed into the interior of the inflatable device. The initiator is effective, upon actuation, to initiate dissociation of the at least one gas source material within the inflatable device to form dissociation products including the at least one gaseous dissociation product.

The prior art fails to provide inflatable device inflation assemblies, systems or the like and improved methods of inflating inflatable devices which provide as great as desired flexibility of operation such as may better permit particular inflatable restraint systems to either or both:

1) be better tailored or adapted for use in specific or particular vehicle designs or 2) better provide or result in safe, simple, effective, economical, and/or reliable occupant protection to various vehicle occupants under an even greater variety of circumstances or conditions.

Further, the prior art fails to provide inflatable restraint systems which provide as great as desired safety, simplicity, effectiveness, economy and/or reliability in the inflation of multiple inflatable restraints, such as airbag cushions, as are more and more commonly being incorporated in modern vehicle design such as to provide increased or improve occupant protection.

The invention still further comprehends an inflatable restraint system. Such a system includes a chamber, opening means, a plurality of inflatable devices, and at lease one first initiator. The chamber contains at least one gas source material. The gas source material, when initiated, dissociates to form dissociation products including at least one gaseous dissociation product. The opening means is actuatable to open the chamber whereby at least a portion of the at least one gas source material can be expelled from the chamber. Each of the plurality of inflatable devices is operatively joined with the chamber whereby, upon opening of the chamber, at least a portion of the at least one gas source material expelled from the chamber is passed into the interior of at least a selected one of said plurality of inflatable devices. The at least one initiator is effective, upon actuation, to initiate dissociation of the at least one gas source material within the selected one of said plurality of inflatable devices.

The invention yet still further comprehends a method for inflating an inflatable device. In such method, a quantity of at least one gas source material which, when initiated, undergoes dissociation to form dissociation products including at least one gaseous dissociation product, is released into the inflatable device.

A method of inflating an inflatable device of an inflatable restraint system in accordance with an alternative embodiment is also provided. The inflatable restraint system includes:

a chamber containing at least one gas source material, which material, when initiated, dissociates to form dissociation products including at least one gaseous dissociation product, opening means actuatable to open the chamber whereby at least a portion of the at least one gas source material can be expelled from the chamber;

a plurality of inflatable devices each operatively joined with the chamber whereby upon opening of the chamber, at least a portion of the at least one gas source material expelled from the chamber is passed into the interior of at least a selected one of the plurality of inflatable devices; and an initiator effective, upon actuation, to initiate dissociation of the at least one gas source material within the selected one of the plurality of inflatable devices.

In accordance with such method, a quantity of at least one gas source material is released from the chamber into the at least a selected one of the plurality of inflatable devices. At least a portion of the released quantity of the at least one gas source material may, if desired, be initiated to dissociate within the inflatable device to form dissociation products including the at least one gaseous dissociation product. Thus, resulting in the further expansion or at least temporary increase in pressure within the associated inflatable device.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure chance the energy which may be required for the dissociation reaction to be completed such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S \qquad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

A "pyrotechnic" material, in its simplest form, consists of an oxidizing agent and a fuel that produce an exothermic, self-sustaining reaction when heated to the ignition temperature thereof.

References to the detection or sensing of "occupant presence" are to be understood to refer to and include detection and sensing of one or more of the size, weight, and/or positions of a particular occupant under consideration.

References to an "adaptive" inflation system and the like are to be understood to refer to inflatable device inflation wherein selected inflatable devices are inflated or inflated in a manner generally dependent on selected operating conditions such as one or more of ambient temperature, occupant presence, seat belt usage and rate of deceleration of the motor vehicle, for example.

References to an opening device, mechanism or the like for the opening, rupturing, or releasing of gas source material storage chamber closure as being "internal" or "external" are to be understood to be in reference the placement of the particular opening device or mechanism relative to the gas source material storage chamber. More specifically, an opening device or mechanism at least in part contained within the gas source material storage chamber is normally considered herein as an "internal" opening device or mechanism as such opening device or mechanism is normally at least in part exposed to the internal conditions of the corresponding gas source material storage chamber. An "external" opening device or mechanism is one which is normally maintained isolated or outside the corresponding gas source material storage chamber, such that the opening device is not normally subject to the conditions (e.g. temperature, pressure, etc.) which occur within the storage chamber.

Other objects and advantages will be apparent to those skilled in the art from the following detailed description taken in conjunction with the appended claims and drawings.

DETAILED DESCRIPTION OF THE INVENTION

The present invention provides apparatus combinations and systems as well as methods for inflating inflatable devices wherein, if required or desired, a gas source material can be initiated to form reaction products including the at least one gaseous reaction product while within an associated inflatable device.

Figure 1:
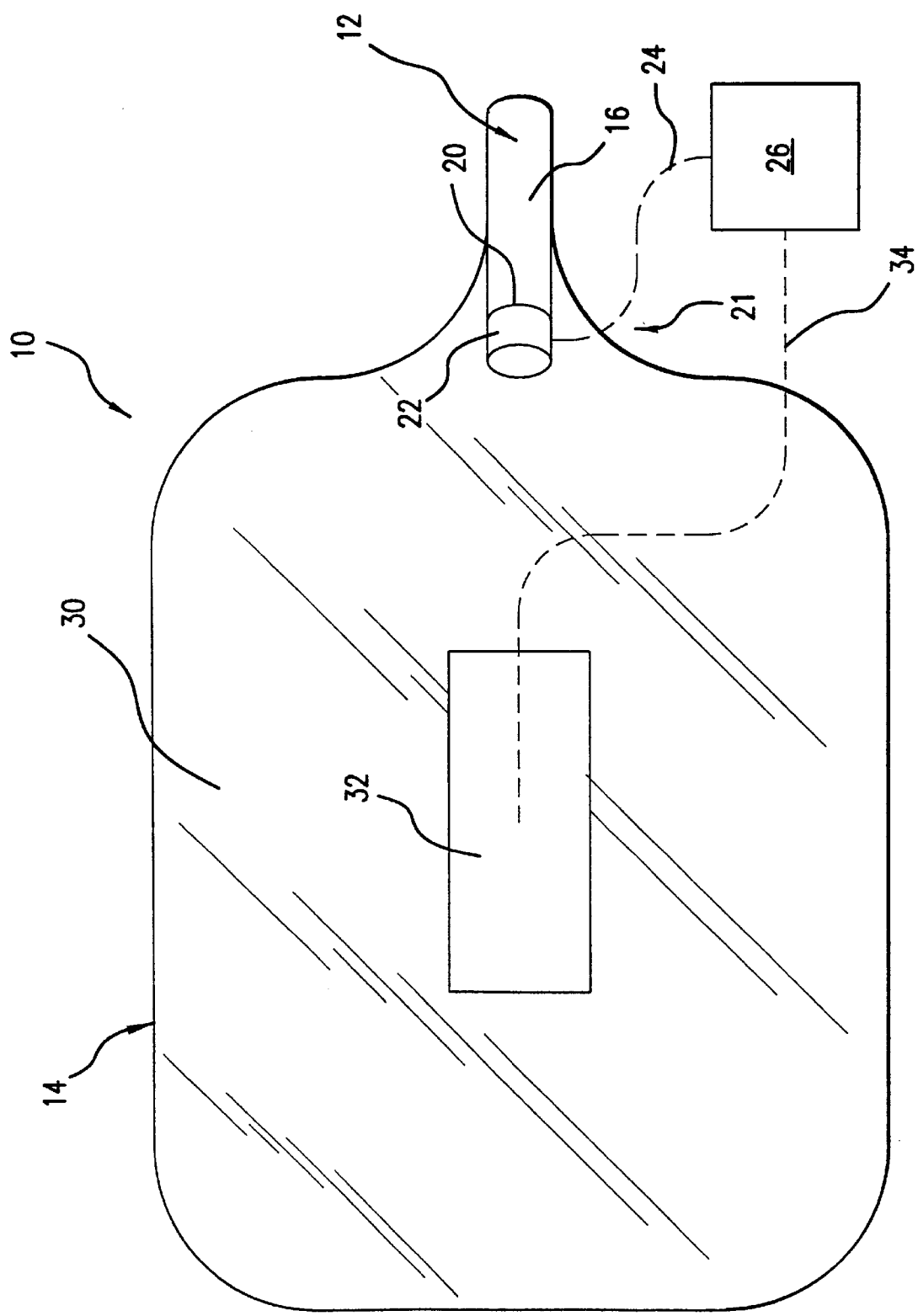
FIG. 1 is an inflatable restraint assembly in accordance with one embodiment of the invention.

The present invention may be embodied in a variety of different structures. Referring initially to FIG. 1, there is illustrated an inflatable restraint assembly, generally designated by the reference numeral 10, in accordance with one preferred embodiment of the invention. The inflatable restraint assembly 10 includes an inflator apparatus 12 and an inflatable device 14 such as may commonly take the form of an inflatable vehicle occupant restraint, e.g., an inflatable airbag cushion, operatively joined or connected to or with the inflator 12. As will be appreciated, such joinder or connection can be effected by various techniques or ways such as known in the art and thus need not be described in greater detail herein.

As is known and upon proper actuation, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

The invention is described hereinafter with particular reference to an inflatable restraint assembly for use in various automotive vehicles including vans, pick-up trucks, and particularly automobiles. As will be appreciated by those skilled in the art, the invention has applicability to various types or kinds of inflatable restraint assembly installations for automotive vehicles including driver side, passenger side, side impact, curtain and carpet airbag assemblies, for example. Moreover, the invention has applicability with other types of vehicles as well, including airplanes, for example.

The inflator 12 generally includes a chamber 16 having contents which include at least one gas source material which, when initiated and as described in greater detail below, dissociates to form dissociation reaction products including at least one gaseous dissociation product. Thus, the chamber 16 is sometimes referred to herein as a "gas source material storage chamber." The inflator 12 has at least one exit opening 20 wherethrouah the at least one gas source material can, when required or desired, be expelled from the inflator 12 and, as may be generally desired, into the operatively joined or connected associated inflatable device 14.

The inflatable restraint assembly 10 also includes a release mechanism, generally designated by the reference numeral 21, such as is actuatable to permit flow of the at least one gas source material through the at least one exit opening 20 whereby at least a portion of the at least one gas source material can be expelled from the inflator 12 and into the associated inflatable device 14.

In the illustrated embodiment, such release mechanism 21 includes a closure 22 such as by which the gas exit opening 20 may normally be maintained in a closed or sealed state or condition. As will be appreciated, other forms of closures or sealing means such as including plugs, caps, rupture or burst discs or the like can be used to seal such an inflator gas exit opening such as to prevent the flow of the at least one gas source material through the at least one exit opening 20.

In the release mechanism 21, the closure 22 is joined, such as shown via the electrical connection 24, to an electrical control system 26 such as to control actuation of the closure 22. The release mechanism 21 may when actuated, as desired or required for particular installations, operate in a manner such as to open, rupture, release the closure 22 or otherwise permit the passage of the gas source material through the opening 20 and into the interior 30 of the inflatable device 14. As will be appreciated, such operation is normally in response to the occurrence of an appropriate crash incident involving a vehicle in which the associated inflatable restraint assembly 10 is housed.

In particular preferred embodiments of the invention, the release mechanism 21 may include a pyrotechnic-containing initiator opening device or mechanism for the opening, rupturing, or releasing of the gas source material storage chamber closure 22. As will be appreciated, such opening device or mechanism may be placed or positioned internally or externally relative to the gas source material storage chamber, as may be desired. For example, while an internal opening device may produce or result in repeatable rupture or opening of an associated chamber closure, such placement may result in reaction, e.g., dissociation, of at least some of the gas source material while such material is still contained within the associated storage chamber. On the other hand, while an external such opening device may reduce or minimize the amount or extent of reaction of the gas source material within the associated storage chamber, such an external opening device may render assuring the rupture or opening of the associated chamber closure more problematic.

It will be appreciated that embodiments of the invention utilizing an external means of opening the gas source material storage chamber can provide additional benefits such as relating to performance and/or design. For example, in such embodiments, the structure of the inflator gas source material storage chamber itself need not be capable of withstanding the high pressures normally associated with gas generation, rather the chamber need only be designed to handle the normal design range of storage pressures. Thus, the chamber need not be made of more costly, high strength materials or of increased thickness of lower strength materials.

Various gas source materials can be used in the practice of the invention. In accordance with at least certain preferred embodiments of the invention, gas source materials utilized in the practice of the invention may desirably take the form of a material which undergoes a dissociative or decompositional reaction, preferably an exothermic such reaction, to form gaseous products such as disclosed in the above-referenced and herein incorporated Rink, U.S. Pat. No. 5,669,629. As will be appreciated, the occurrence of such an exothermic reaction results in the generation, production or release of heat such as may serve to heat gaseous species to increase the pressure thereof. Thus, the occurrence of such exothermic dissociation not only serves to increase the molar content of gas within the inflatable device but also to heat the gases present or otherwise formed within the inflatable device and thus further increase the pressure within the inflatable device.

As disclosed in Rink, U.S. Pat. No. 5,669,629, such gas source materials may include:

acetylene(s) and acetylene-based materials such as acetylene and methyl acetylene, as well as mixtures of such acetylene(s) and acetylene-based materials with inert gas(es):

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, upon the dissociation of nitrous oxide, the dissociation products ideally are nitrogen and oxygen:

$$2N_2O = 2N_2 + O_2 \qquad (2)$$

Thus, not only does such reaction form products which are generally non-toxic and non-corrosive but such reaction also results in the production or formation of molecular oxygen, such as may be desired with certain inflator designs.

It is to be understood that gas source materials, such as nitrous oxide, useable in the practice of the invention can take various forms. For example, such gas source materials can be stored in a gaseous, liquid or multi-phase form (i.e., partially gaseous and partially liquid mixture), as may be desired. The common premium in modern vehicle design placed on minimizing the size requirements for vehicular components such as inflatable restraint systems generally results in a preference for smaller sized airbag inflators. In view thereof and the fact that the density of such gas source materials is typically significantly greater when in liquid, rather than gaseous form, one preferred embodiment of the invention involves the storage of nitrous oxide primarily in a liquid form. As will be appreciated, a gas source material such as nitrous oxide, if stored in the form of a liquid will typically readily form or convert to a gaseous form upon release from the inflator 12 into the unpressurized environment of the inflatable device interior 30.

Further, the storage of the gas source material, at least in part and preferably at least nearly completely, in a liquid phase may desirable reduce or minimize the size or volume of inflator chamber required for gas source material storage or containment. As a result, significantly smaller and lighter weight inflator devices are possible and which in turn may provide or result in increased or improved design flexibility both for corresponding inflatable restraint systems and the vehicles in which such systems are to be placed.

It is also to be understood that while such nitrous oxide dissociative gas source material can be contained within the inflator 12 in a pure form (e.g., such that the inflator chamber 16 contains no more than minor levels of other materials, such as air as may be present in the chamber prior to being filled with the dissociative gas source material), it may be preferred for the fluid load contained within the chamber to also include an inert gas therewith. For example, an inert gas such as helium can be included with nitrous oxide to facilitate leak checking of the inflator apparatus or, more specifically, of the dissociative chamber thereof. Alternatively or in addition, an inert gas, such as argon and helium, for example, or mixture of such inert gases, can be included to supplement the gas produced or formed upon the dissociation of the nitrous oxide.

Further, additionally or alternatively and as disclosed in the above-identified U.S. patent application Ser. No. 08/935, 016, the fluid load within the inflator chamber 16 may include a quantity of at least one radioactive isotope leak trace material whereby fluid leakage from the chamber can be detected as disclosed therein.

In addition, if desired, the fluid load within the inflator chamber 16 may additionally include a quantity of oxygen gas such as in molecular form and such as may supplement molecular oxygen such as may be formed upon the dissociation of stored or included nitrous oxide.

The inflatable device interior 30 desirably contains an initiator 32 effective, upon actuation, to initiate dissociation of the at least one gas source material within the inflatable device 14 such as to form dissociation products including the at least one gaseous dissociation product. As shown, the initiator 32 may desirably be joined, such as shown via the electrical connection 34, to the electrical control system 26 such as to control actuation of the initiator 32 and thus reaction of the gas source material.

The initiator 32 can take various forms as may be desired including, for example, a catalyst or a heat source such including a selected linear initiator source such as to promote, accelerate or otherwise initiate dissociation of the gas source material within the inflatable device 14 upon actuation. As the energy or heat output of the initiator can, at least in part, serve to control the gas pressure within the associated inflatable device, one or more initiator design parameters or characteristics such as size, energy output or geometry can be selected to provide energy or heat output tailored to particular applications or inflation events.

A preferred linear initiation source in accordance with one preferred embodiment of the invention is commonly referred to as a linear ignition cord. One preferred linear ignition cord useful in the practice of the subject invention is a tin-sheathed linear ignition cord composed of 27.5 wt. % dicesium dodecaborohydrate and 72.5 wt. % potassium nitrate, commonly referred to as RDC (rapid deflagration cord).

In accordance with another preferred embodiment of the invention, a linear initiation source incorporated within the corresponding inflatable device has the form of a flexible ignition transfer line. Such an ignition transfer line can typically take the form of a small diameter plastic tube coated on the inside surface with a reactive material to sustain ignition from one end of the line to the other. Examples of explosive transfer lines useable in the invention include ITLX and TLX (Explosive Technology Inc., now called OEA Aerospace, Inc.) and NONEL (Ensign Bickford, Inc.). ITLX transfer lines typically include a reactive material comprising a mixture of aluminum powder, ammonium perchlorate and a latex binder and are advantageously characterized by high energy and flame outputs. TLX and NONEL transfer lines are generally advantageously characterized as burning very cleanly.

The incorporation and use of such an ignition transfer line in accordance with the invention can afford various significant advantages in the initiation of the reaction of the at least one gas source material within the associated inflatable device. For example, to dissociate gas source materials such as nitrous oxide in relatively large quantities, such as would be normally associated with or in conjunction with the a passenger-sized airbag cushion, it may be necessary or desirable to sustain such dissociating initiation energy for an extended or prolonged period of time. The provision of such initiation energy for extended or prolonged periods of time can be relatively readily and conveniently accomplished through the utilization of a linear ignition source such as described herein.

Further, flexible ignition transfer lines, such as described above, are well suited to provide an initiation charge which is relatively long and which provides desired initiation over an extended period of time. For example, if desired, such a flexible ignition transfer line can be arranged in a spiral wound arrangement, with the length of transfer line controlled by the number of and spacing between the windings.

Another beneficial quality or characteristic of such flexible ignition lines and associated with their use is that such transfer lines are commonly designed to be relatively robust and therefore relatively insensitive to heat and vibration. Consequently, such transfer lines may be used without additional assembly components such as surrounding metal tubes and screen wraps and the increased costs, weight and bulk typically associated with the inclusion of such support structures.

With such linear initiation sources, the specific reactive materials, amounts, and forms (e.g., diameters and lengths) can be selected to provide particularly desired or selected outputs of heat or energy.

With respect to the incorporation and utilization of a catalytic material as an initiator, it is generally well known that metallic oxides can be used to catalyze the dissociation of nitrous oxide. Such metallic oxides include, but are not limited to: cupric oxide (CuO), cuprous oxide ($Cu_2O$), nickel oxide (NiO), cobalt oxide (CoO), zinc oxide (ZnO), magnesium oxide (MgO), aluminum oxide ($Al_2O_3$) and iron oxide ($Fe_2O_3$), for example. In addition, under appropriate temperature conditions, pure metals such as gold, silver and platinum are also known to catalyze the dissociation of nitrous oxide.

As will be appreciated by those skilled in the art, the performance of catalysts can be significantly influenced by various operational parameters including: temperature, gas concentration and pressure, as well as by the physical and surface characteristics of the catalyst material itself. For example, it may be desirable or strongly preferred for the catalyst material to be heated, such as by means of an electrical heating element, such that the catalyst is maintained at the proper or required temperature to result in the desired dissociation of the gas source material. Additionally, due to the dynamics normally associated with the inflation of vehicle occupant inflatable restraints, the time available for the dissociation to occur is generally very limited. Thus, the practice of the invention utilizing such catalytic materials may be difficult or more complicated than may be preferred.

To further highlight at least some of the benefits obtainable through the practice of the invention, the operation of an inflatable restraint assembly in accordance with a preferred embodiment of the invention and including an inflator containing an exothermic dissociative gas source material, e.g., nitrous oxide, will be described.

In operation, such as upon the sensing of a collision, an electrical signal is sent such as from a sensor (not shown and such as appropriately placed in or on the vehicle housing the inflatable restraint assembly 10) to the electrical control system 26. The control system 26 functions to send a signal via the connection 24 to actuate the closure 22 such as to open, rupture, release the closure 22 or otherwise permit the flow of gas source material (e.g., nitrous oxide) through the opening 20 and into the interior 30 of the inflatable device 14. With such flow, the inflatable device 14 inflates at or to a relatively low internal pressure.

With the passage of nitrous oxide gas source material into the inflatable device 14, such gas source material can, if required or desired, be actuated to react within the inflatable device interior 30 to form dissociation products including one or more gaseous dissociation products such as may serve to either or both more fully, completely or rapidly the inflatable device 14. For example, such actuation can be effected by the electrical control system 26 appropriately sending a signal, such as shown via the electrical connection 34, to the initiator 32 such as to thus control reaction of the gas source material.

As will be appreciated, such actuation may desirably be simultaneous or substantially simultaneous with the passage of gas source material into the inflatable device 14. In accordance with one preferred embodiment of the invention, the gas source material is actuated to react within the inflatable device interior 30 only after the passage of a selected interval of time after gas source material has entered into the inflatable device 14.

It is to be appreciated that operation in the manner described above permits the initial deployment of the inflatable device 14 with gas source material, e.g., nitrous oxide, from the inflator 12. As will be appreciated, such initial deployment relying primarily on the passage of unheated nitrous oxide into the inflatable device interior 30, desirably is more gradual or gentler than if higher pressure gas were used. As described above, such more gradual or gentler deployment can be desired in a variety of circumstances such as, for example, in the event of a collision of relatively low severity, an out-of-position occupant or in connection with the protection of at least certain occupants of relatively smaller size including, for example, young children.

Should a higher gas pressure within the inflatable device be required or desired such as in the event of a severe crash or to more fully or completely cushion or protect a properly seated and seat belt retrained individual, the initiator 32 can be actuated to initiate dissociation of the nitrous oxide gas source material within the inflatable device to form reaction products including gaseous dissociation products (increasing the molar content of gas within the inflatable device) and heat (heating the gaseous materials within the inflatable device and thus increasing pressure associated therewith). Thus, providing or resulting in a higher pressure within the inflatable device 14.

More specifically, the initiator typically functions or serves to transfer heat to the initially cool nitrous oxide gas source material gas introduced into the inflatable device. With such heat transfer, the local gas temperature increases and results in commencement of the exothermic thermal dissociation of nitrous oxide, such as when the local gas temperature exceeds the dissociation temperature of nitrous oxide. In such exothermic thermal dissociation, nitrous oxide begins to breakdown into smaller molecular fragments. The increase in gaseous molecular species within the fixed volume of the inflatable device results in an increase in the pressure within the inflatable device. The energy released in association with such dissociation reaction results in further heating of the gases contained within the inflatable device and, in turn, further increases the pressure of the gaseous species contained within the inflatable device.

In accordance with a preferred practice of the invention, the dissociation processing within the inflatable device is advantageously accomplished in a nonluminous fashion thereby avoiding the presence or occurrence of flash or flame within the inflatable device, other than possibly associated with the initiator device. As will be appreciated, avoiding the occurrence of luminescence or flash within the inflatable device can desirably help avoid or minimize unwarranted system operation concerns by occupants, emergency response personnel and bystanders. For example, avoiding the presence or occurrence of flash or flame within the inflatable device may minimize or reduce concerns relative to potential fires in association with the deployment of the respective inflatable device.

Thus, the invention provides a method for inflating an inflatable device wherein a quantity of at least one gas source material is released into an inflatable device and which gas source material may, if and when desired be initiated to undergo dissociation to form dissociation products including at least one gaseous dissociation product such as to increase the pressure within the inflatable device.

In view of the above, the invention provides assemblies and techniques for inflating inflatable restraints such as airbag cushions which are improved in terms of one or more of safety, simplicity effectiveness, economy and reliability. More specifically, the invention provides assemblies and techniques such as may provide or result in increased or greater flexibility of operation. For example, the invention may better permit particular inflatable restraint systems to either or both:

1) be better tailored or adapted for use in specific or particular vehicle designs or 2) better provide or result in safe, simple, effective, economical, and/or reliable occupant protection to various vehicle occupants under an even greater variety of circumstances or conditions.

Figure 2:
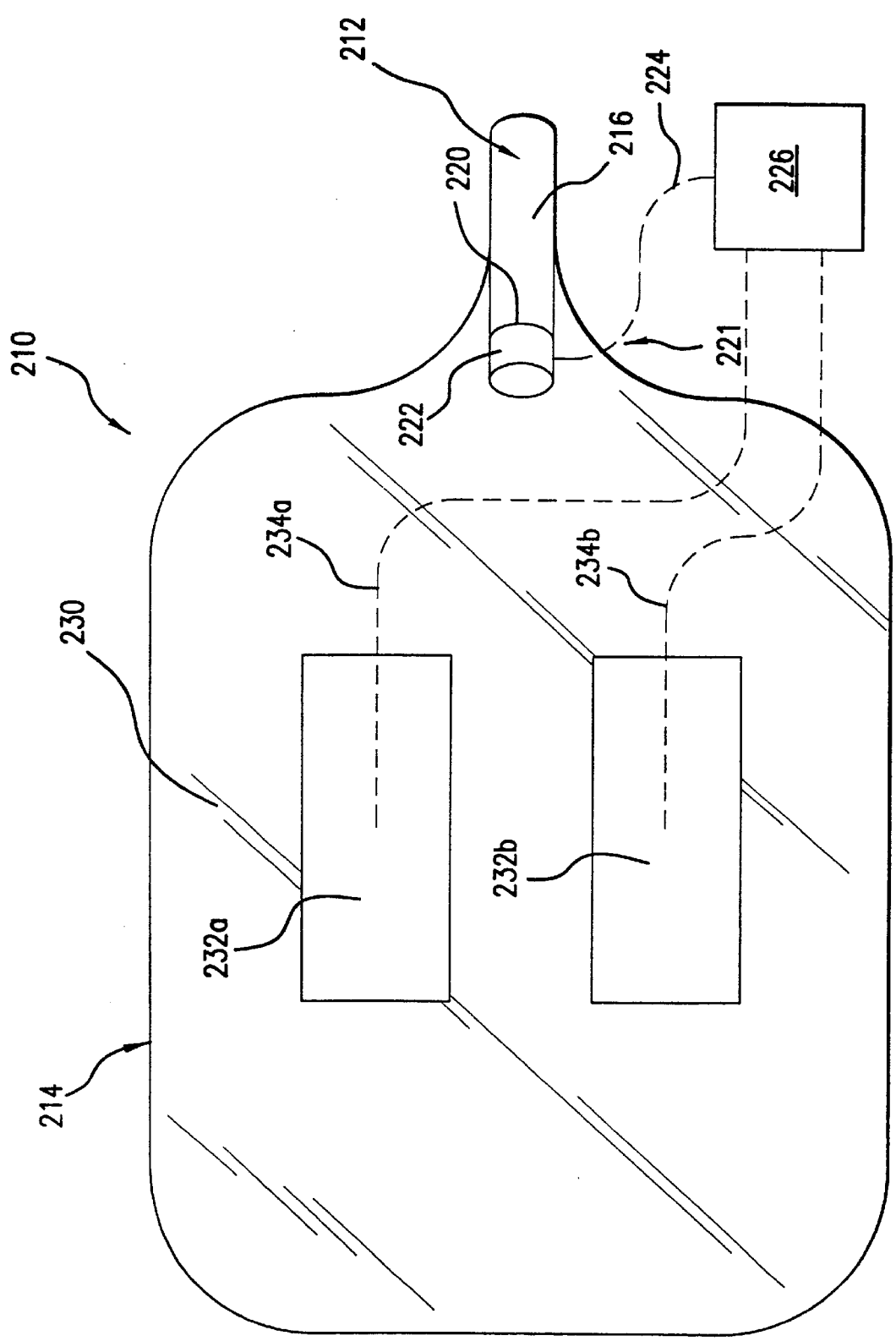
FIG. 2 is an inflatable restraint assembly in accordance with an alternative embodiment of the invention.

Turning to FIG. 2, there is illustrated an inflatable restraint assembly, generally designated 210, in accordance with an alternative embodiment of the invention. The inflatable restraint assembly 210 is in many respects generally similar to the inflatable restraint assembly 10 illustrated in FIG. 1 and described above. More specifically. the inflatable restraint assembly 210, similar to the inflatable restraint assembly 10 includes an inflator apparatus 212 and an operatively joined or connected inflatable device 214 such as may commonly take the form of an inflatable vehicle occupant restraint, e.g., an inflatable airbag cushion.

The inflator 212 also generally includes a chamber 216 having contents which include at least one gas source material such as described above and which, when initiated, dissociates to form dissociation products including at least one gaseous dissociation product. The inflator 212 further has at least one exit opening 220 wherethrough the at least one gas source material can when required or desired be expelled from the inflator 212 and, as may be generally desired, into the associated inflatable device 214.

The inflatable restraint assembly 210 includes a gas release mechanism 221 such as is actuatable to open an associated closure 222 to permit flow of the at least one gas source material through the at least one exit opening 220 whereby at least a portion of the at least one gas source material can be expelled from the inflator 212.

In the release mechanism 212, the closure 222 is joined, such as shown via the electrical connection 224, to an electrical control system 226 such as to control actuation of the closure 222. The release mechanism 221 may when actuated, as desired or required for particular installations, operate in a manner such as to open, rupture, release the closure 222 or otherwise permit the passage of the gas source material through the opening 220 and into the interior 230 of the inflatable device 214.

The inflatable restraint assembly 210 differs from the inflatable restraint assembly 10 described above in that the assembly 210 contains, within the inflatable device interior 230, first and second initiators, 232a and 232b, respectively, such as described above. The initiators 232a and 232b are each joined. such as shown via the electrical connections 234a and 234b, respectively, to the electrical control system 226 such as to control actuation of the initiators 232a and 232b and thus reaction of the gas source material.

As will be appreciated, the inclusion of multiple initiators may serve to further enhance operational flexibility and adaptability. For example, neither, in such an assembly, either or both such multiple initiators can be actuated. Further, where two or more of such initiators are actuated, such actuation can be substantially simultaneously or sequentially, as desired. Still further, such sequential actuation, as may be required or desired, can be done in an overlapping or consecutive manner. Yet still further, such consecutive sequential actuation can be done without any time delay therebetween or with a selected time interval between each such sequential actuation, as may be desired.

Additionally, such multiple initiators may, if desired, be of different selected size, energy output or geometry. Thus, where only one of such initiators is to be actuated, such an assembly permits the selection and actuation of the initiator best suited to provide or result in desired gas pressure within the associated inflatable device. Alternatively, where two or more of such initiators of different size, energy output or geometry are sequentially actuated, the particular sequence of initiator actuation can be selected to best tailor the deployment and inflation of the associated inflatable device to the particular deployment situation.

As will be appreciated, the manner of operation of such an inflatable restraint assembly 210 is in many respects generally similar to that described above relative to the inflatable restraint assembly 10 with the added further operational flexibility provided, as described above, through the inclusion of two initiators 232a and 232b.

It is to be further appreciated that while the invention has been described above relative to inflatable restraint assemblies containing one and two initiator devices, respectively, within the corresponding inflatable device, the invention in its broader practice is not so limited. Thus, it is to be understood that the invention can be practiced with three or more such initiators, if required or desired.

Thus, the invention provides assemblies and techniques for inflating inflatable restraints such as airbag cushions which are of improved adaptability and which may more easily be adapted to provide particular inflatable restraint inflation dependent on selected operating conditions such as one or more of ambient temperature, occupant presence, seat belt usage and rate of deceleration of the motor vehicle, for example.

Figure 3:
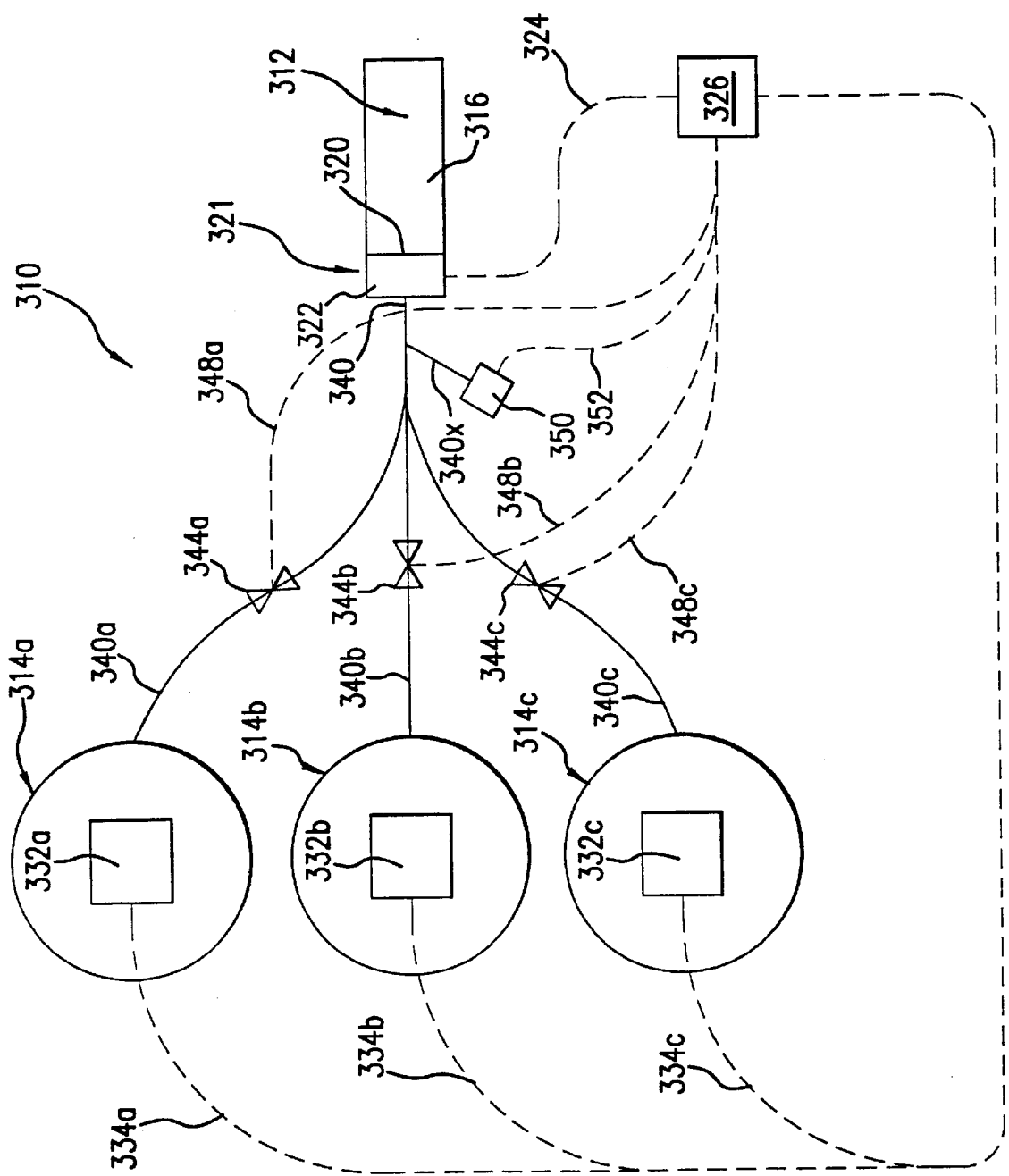
FIG. 3 is an inflatable restraint system in accordance with one embodiment of the invention.

Turning now to FIG. 3. there is illustrated an inflatable restraint system, generally designated by the reference numeral 310, in accordance with one embodiment of another aspect of the invention.

The system 310 includes an inflator apparatus 312 operatively joined or connected to three inflatable devices such as may commonly take the form of an inflatable vehicle occupant restraint, e.g., an inflatable airbag cushion, and herein individually designated 314a, 314b, and 314c.

The inflator 312 similar to the inflators 12 and 212 described above, generally includes a chamber 316 having contents which include at least one gas source material such as described above and which, when initiated, dissociates to form dissociation products including at least one gaseous dissociation product. The inflator 312 further has at least one exit opening 320 wherethrough the at least one gas source material can when required or desired be expelled from the inflator 312 and, as may be generally desired, into one or more of the associated inflatable devices 314a–c.

The system 310 includes a gas release mechanism 321 such as is actuatable to open an associated closure 322 to permit flow of the at least one gas source material through the at least one exit opening 320 whereby at least a portion of the at least one gas source material can be expelled from the inflator 312.

In the release mechanism 321, the closure 322 is joined, such as shown via the electrical connection 324 to an electrical control system 326 such as to control actuation of the closure 322. The release mechanism 321 may when actuated, as desired or required for particular installations, operate in a manner such as to open, rupture, release the closure 322 or otherwise permit the passage of the gas source material through the opening 320 and into the transfer line 340. The transfer line 340 forms three branches 340a–c one of which is respectively joined to a corresponding one of the inflatable devices 314a–c, respectively.

Each of the branch transfer lines 340a–c includes a flow valve 344a–c, respectively. Such flow valves may for example and as may be desired, be electrically or explosively actuated. The flow valves 344a–c are joined, such as shown via the electrical connections 348a–c, to the electrical control system 326 such as to control actuation of the valves 344a–c to desirably control flow of gas source material therethrough into a corresponding inflatable device 314a–c.

The inflatable devices 314a–c, similar to the inflatable device 14 described above, each includes an initiator 332a–c such as described above and effective, upon actuation, to initiate reaction of the at least one gas source material within the corresponding inflatable device 314a–c such as to form dissociation products including the at least one gaseous dissociation product.

The initiators 332a–c may desirably be joined, such as shown via the electrical connection 334a–c, to the electrical control system 326 such as to control actuation of the initiators 332a–c and thus dissociation of the gas source material.

The transfer line 340 additionally forms a branch 340x which, as shown in FIG. 3 and described in greater detail below, is joined to a vent assembly, such as generally designated by the reference numeral 350. The vent assembly 350 such as in a form including an actuatable valve, for example, permits the venting or diverting, such as to the atmosphere, of at least a selected portion of the gas source material released from the inflator 312. The vent assembly 350, in turn, is desirably joined, such as via the electrical connection 352, to the electrical control system 326 such as to control the venting of material therethrough.

The system 310 utilizes a single inflator device for the inflation of one or more of multiple connected inflatable devices. As will be appreciated, with such a system, one or more driver, passenger, side, curtain and carpet inflatable device airbag cushions may, for example, be selectively inflated based on one or more selected operating conditions such as ambient temperature, occupant presence, seat belt usage and rate of deceleration of the motor vehicle, for example.

As will be appreciated, in such an inflatable restraint systems a selected quantity of the at least one gas source material can be released from the inflator chamber 316 into one or more selected of the plurality of inflatable devices 314a–c. Also, in such a system wherein multiple inflatable devices are associated with a particular inflator, such multiple inflatable devices may, as desired be of the same or different type or form. For example, two or more such inflatable devices associated with a single inflator can each be a driver, passenger, side impact, curtain or carpet inflatable device, for example.

Further, the inflatable devices associated with a particular inflator device can be for the protection of a single vehicle occupant. For example, the inflatable devices may each be for the protection of the vehicle driver and may include a frontal collision airbag, a side impact airbag, a curtain airbag and a carpet airbag, for example. Alternatively, the inflatable devices associated with a particular inflator device can be for the protection of possibly variously located or positioned occupants. Thus, a single inflator device may in accordance with the above-described invention serve as the inflation material source for both a driver side and passenger side inflatable restraint, for example.

The proper actuation and control of the vent assembly 350 provides another means of controlling the gas source material released from the inflator chamber 316. For example, in an instance where the inflatable restraint system 310 is required or desired to provide only a relatively small portion of the gas source material originally stored within the inflator device 312, excess gas source material can be diverted and vented via the vent assembly 350 such as to avoid either or both unnecessary or undesired inflatable device deployment and inflation.

Also, while the invention has been described above relative to an inflatable restraint system 310 which utilizes a single control system 326 for control of opening of the inflator closure 322; control of the flow control valves 344a–c and vent assembly 350 and actuation of the initiators 332a–c, it will be appreciated that the broader practice of the invention is not so limited. For example, the control of one or more such specific functions for some or the entire system can, if desired, be accomplished by a second or other selected control system.

It will be noted that vehicle occupant inflatable restraint systems wherein the gas source chamber is positioned relatively remote or at an extended distance from a specific associated inflatable device may result in the length of time between system actuation and deployment (e.g., deployment delay) being undesirably long for typical system installations which rely on post-crash sensors to trigger activation. New systems, however, are now under development which systems utilize or rely on forms or types of pre-crash sensors. Such pre-crash sensors may take various forms including optical-based systems and radar-like systems, for example. As will be appreciated, the additional lead time provided by such pre-crash sensors can serve to render more practical vehicle occupant inflatable restraint systems, such as described above, wherein the gas source chamber is positioned relatively remote or at an extended distance from a specific associated inflatable device.

Thus, the invention also provides an improved inflation system wherein multiple inflatable airbag cushion devices can be inflated using a single inflator device thus avoiding the need for dedicated inflator devices for each inflatable device and the costs associated with the design manufacture, installation and maintenance of each such dedicated inflator device.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Comparative Examples (CE) 1–2 and Examples (Ex.) 1–6

In these examples, the feasibility of the inventive inflation system was evaluated through a series of trials in which a nitrous oxide-bearing gas was dissociated in a closed volume. The closed volume used for these trials was a cylindrical test tank which had an internal volume of 1 cubic foot (28.3 liters). Such tanks are commonly used to test the performance of airbag inflators with tanks of this relative small volume having particular applicability for the testing of those inflators designed for side impact or inflatable curtain applications.

The basic objective of this first set of trials was to determine if nitrous oxide could be dissociated in such a tank. For each of these trials. TABLE 1, below. identifies the respectively used gas compositions, as well as their respective approximate molecular weights and masses. It will be noted that as different gas mixtures were used and because the mixtures were each loaded into the respective tank to atmospheric pressure, the amount of gas used in each trial was not necessarily the same. Thus, TABLE 1 also identifies the mass of gas used in each of these trials. CE1–2 utilized a gas composition of 100% Argon while Ex. 1–6 used various specified nitrous-containing compositions.

In each of these trials, the indicated gas composition was simply loaded in the indicated amount into the tank at atmospheric pressure and no inflator device per se were used. (Tests employing actual inflator hardware were used in later described Examples.) Other objectives of these initial tests included demonstrating the effect of nitrous concentration on dissociation and illustrating the effect of pyrotechnic load on dissociation.

Dissociation of the nitrous oxide gas source material within the test tank was initiated using a linear ignition cord known as ITLX, as identified above. The approximate calorific content of the ITLX material (heat of explosion) was about 1750 cal/g. As will be understood by those skilled in the art, many other alternative pyrotechnic or other form of ignition materials can, if desired, be used in the inventive system.

To vary the amount of external dissociation of nitrous oxide, different lengths of ITLX ignition cord were used. TABLE 1, below, identifies the length of ITLX ignition cord used in each of the respective trials. Thus, while the mass of the gas within the tank was held relatively constant, the effect of gas concentration and total mass of ignition cord pyrotechnic could be evaluated.

TABLE 1

| Trial | Gas Composition (molar %) | | | MW (g/gmol) | Mass (g) | ITLX (ft) | % $N_2O$ Diss. |
|---|---|---|---|---|---|---|---|
| | $N_2O$ | Ar | He | | | | |
| CE1 | — | 100 | — | 39.95 | 39.3 | 2 | 0 |
| CE2 | — | 100 | — | 39.95 | 39.3 | 4 | 0 |
| Ex.1 | 5 | 85 | 10 | 36.56 | 36.0 | 2 | 52.5 |
| Ex.2 | 5 | 85 | 10 | 36.56 | 36.0 | 4 | 96.8 |
| Ex.3 | 15 | 75 | 10 | 36.96 | 36.4 | 2 | 73.7 |
| Ex.4 | 20 | 70 | 10 | 37.17 | 36.6 | 2 | 74.0 |
| Ex.5 | 20 | 70 | 10 | 37.17 | 36.6 | 4 | 99.8 |
| Ex.6 | 100 | — | — | 44.01 | 43.3 | 4 | — |

Discussion of Results

Figure 4:
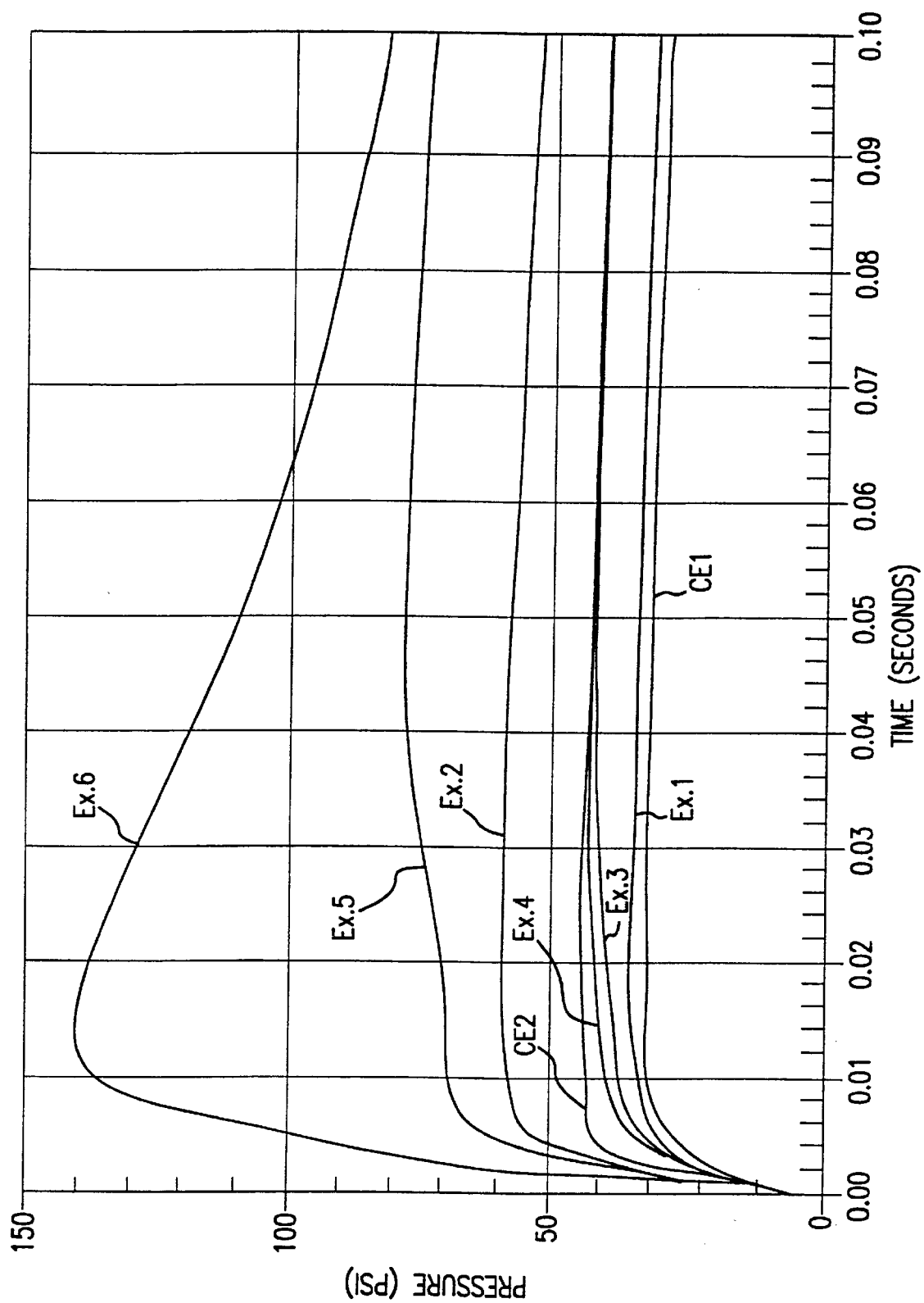
FIG. 4 is a graphical depiction of tank pressure as a function of time performance realized in the test tank for Comparative Examples 1–2 and Examples 1–6.

The results from these trials are illustrated in FIG. 4 and shown in TABLE 1.

As shown in FIG. 4, the highest recorded tank pressure was produced by the dissociation of 100 percent nitrous oxide while using 4 feet of ITLX ignition cord. Given local atmospheric conditions, a pressure of about 155 psia (1068.7 kPa) was recorded. It is important to note that in a similar test involving 4 feet of ITLX ignition cord, but with 100% argon rather than 100% nitrous oxide (i.e., CE 2), a pressure of only about 55 psia (379 kPa) was achieved in the test tank. This performance difference is attributable to nitrous oxide dissociation, as discussed below. Thus, these trials demonstrate that nitrous oxide can be dissociated in a test tank.

The effect of nitrous oxide concentration is clearly evident from FIG. 4. Generally, for a given length of ITLX ignition cord (and, thus, the same amount of energy input into the gas) higher nitrous concentrations resulted in increased tank pressure. This is also indicative of the influence of nitrous oxide dissociation, since all the different gas mixtures were at the same initial pressures and their masses were nearly equal.

After each trial, except Example 6 (100% nitrous oxide), a sample of the gas remaining in the test tank was withdrawn and analyzed for chemical content. From these results, a calculation can be made to determine what fraction of the initial nitrous oxide charge had dissociated into nitrogen and oxide. The results shown in TABLE 1 indicate that higher loads of ITLX ignition cord resulted in increased nitrous oxide dissociation. This is to be expected since more heat will be transferred to the stored gas as pyrotechnic load is increased (assuming complete combustion of the pyrotechnic.)

Examples (Ex.) 7–13

The feasibility of the inventive inflation system was further evaluated through a series of examples wherein a nitrous oxide-bearing gas was dissociated externally of an inflator.

These examples employed a stored gas test inflator having an internal volume of 6 cubic inches (98.3 cc), initially containing 35 grams of a gas mixture consisting of 30% nitrous oxide, 60% argon, and 10% helium (molar basis). The gas mixture was held within the test inflator by means of a burst disc. At the ambient temperature of 68° F. (20° C.), the storage pressure within the test inflator was about 2680 psia (18.5 MPa).

In these examples, the stored gas test inflator was bolted externally to a rigid test tank having a 1 cubic foot (28.3 liter) closed volume. A standard 90-mg zirconium potassium perchlorate (commonly referred to as "ZPP") pyrotechnic formulation initiator was used to rupture the burst disc used to hold the gas mixture within the inflator. In each example, once the disc was ruptured, the gas mixture flowed into the associated test tank through a single orifice 0.375 inches (0.953 cm) in diameter.

The test tank contained, stored loosely in the bottom thereof, a separate pyrotechnic ignition system composed of a linear ignition cord of a mixture of 27.5% dicesium dodecaborohydrate and 72.5% potassium nitrate (mass basis). This material is generally known to those skilled in the art as RDC (rapid deflagration cord), and is available from Teledyne McCormick Selph, of Hollister, Calif., USA. Again, as will be understood by those skilled in the art, many other alternative pyrotechnic or other form of ignition materials can, if desired, be used in the inventive system.

The RDC ignition cord used in these trials measured about 0.030 inches (0.076 cm) in diameter, and had a calorific content (heat of explosion) of about 1200 cal/g. To vary the amount of external dissociation of the nitrous oxide, different lengths of RDC were used. Thus, the total mass of RDC was varied, but the mass of nitrous-bearing gas was held constant (at 35 grams). The combustion of larger masses of RDC resulted in more heat being liberated and transferred to the nitrous bearing mixture. Thus, the tank pressure progressively increases with pyrotechnic (RDC) load—as does the percentage of nitrous undergoing dissociation. The length of ignition cord used in each of these examples is identified in TABLE 2, below.

An electric match pyrotechnic product, such as manufactured by Daveyfire Inc. of Sacramento, Calif. USA and as well known to those schooled in the art, was employed to ignite the RDC. The particular electric matches used featured a load of 35 mg of lead mononitroresorcinate. While such electric matches provide a relatively inexpensive means of ignition, it will be understood that numerous other ignition systems could be used with relatively or generally the same effectiveness.

In each of Examples 8–13, the RDC ignition cord was ignited 20 milliseconds after the burst disc had ruptured. Upon actuation, the tank-contained pyrotechnic ignition system released heat to initiate dissociation of the nitrous oxide externally of the inflator. Thus, this experimental apparatus arrangement provided a means of simulating the external dissociation of nitrous oxides as in an actual airbag cushion.

TABLE 2

| Example | RDC Length (ft) | % N$_2$O Diss. |
| --- | --- | --- |
| 7 | 0 | 0 |
| 8 | 2 | 0 |
| 9 | 3 | 0 |
| 10 | 4 | 0.1 |
| 11 | 6 | 3.7 |
| 12 | 7 | 6.3 |
| 13 | 8 | 15.4 |

Discussion of Results

Figure 5:
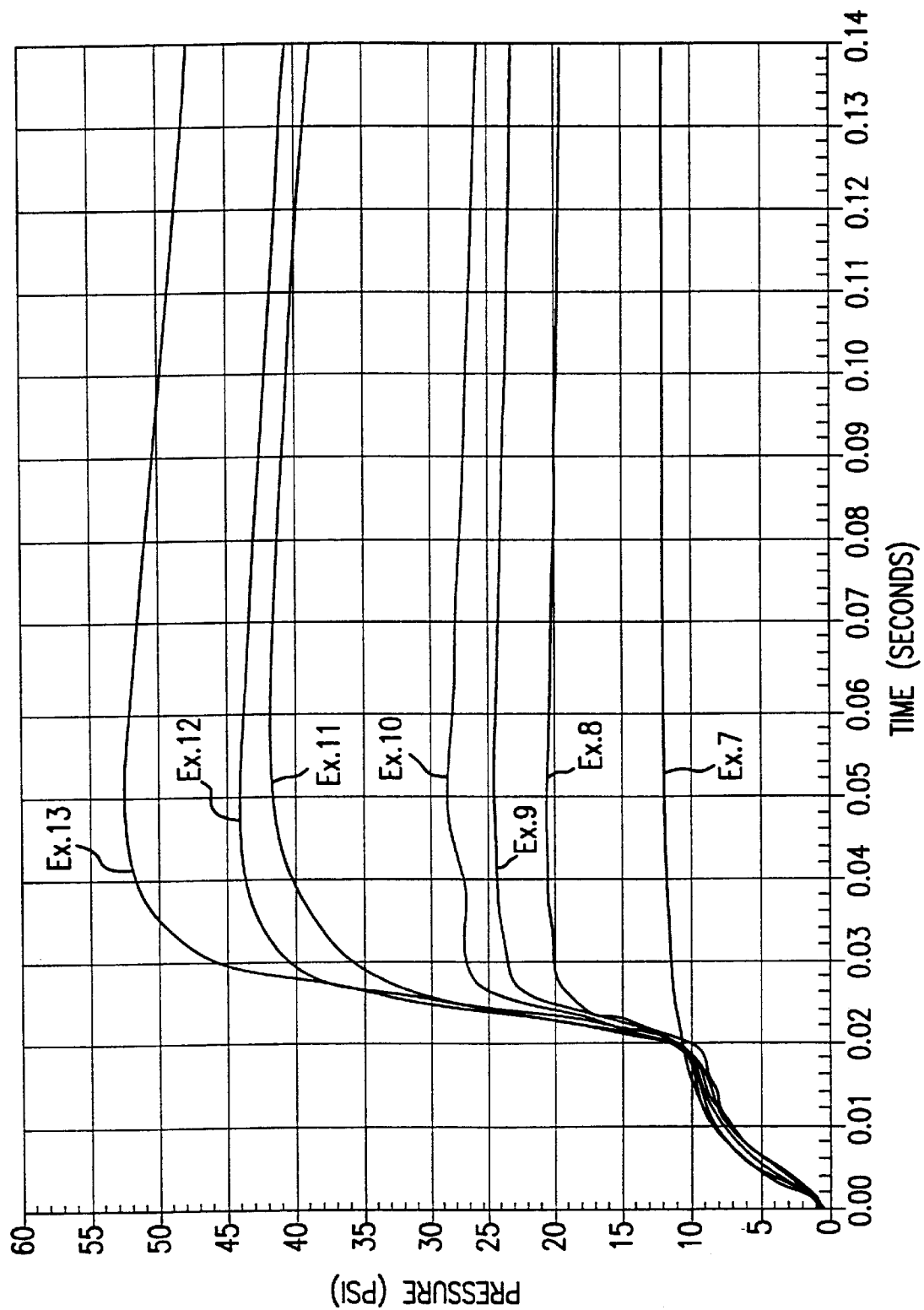
FIG. 5 is a graphical depiction of tank pressure as a function of time performance realized in the test tank for Examples 7–13.

The results from these trials are illustrated in FIG. 5 and shown in TABLE2.

As shown in FIG. 5, the lowest pressure curve corresponds to essentially the release of only cold gas from the inflator (Example 7). In Example 7, no RDC was actuated in the external 28.3-liter volume, and thus no nitrous oxide was dissociated. The only heat addition corresponded to that of the 90-mg ZPP initiator used to rupture the burst disc of the inflator pressure vessel.

Example 13 produced the highest-pressure curve with the firing of 8 feet (2.4 m) of RDC ignition cord in the tank 20 milliseconds after burst disc rupture. Example 12, with the firing of 7 feet (2.13 m) of RDC ignition cord in the tank produced the second greatest maximum pressure. Similarly, it is evident that progressively lower amounts of pyrotechnic produced correspondingly lower tank pressures. This is to be expected, since as the pyrotechnic load decreases, the amount of heat transferred to the nitrous oxide-bearing gas also decreases.

The relative amount of nitrous oxide dissociated in Examples 7–13 was calculated by the same technique described above relative to Comparative Examples 1–2 and Examples 1–5. These results are identified in TABLE 2.

No nitrous oxide dissociated in the assemblies having RDC ignition cord lengths of 2 and 3 feet (Examples 8 and 9, respectively) and essentially no nitrous oxide dissociated in the assembly having an RDC ignition cord length of 4 feet (Example 10), yet the tank pressures were seen to progressively increase in assemblies having increased lengths of ignition cord. Such pressure increase is believed attributable to the increased relative amounts of energy (heat) resulting from the burning of such increased lengths of ignition cord. It thus appears that in Examples 8–10 not enough energy was added to result in significant nitrous oxide dissociation. The ignition of the higher pyrotechnic loads associated with Examples 11–13. however, did result in significant dissociation.

It is also interesting to compare the relative percentages of nitrous oxide dissociation between the first set of examples (Examples 1–6) and the second set of examples (Examples 7–13). The nitrous oxide dissociation percentages obtained in the first set of examples were much greater as compared to the nitrous oxide dissociation percentages obtained in the second set of examples. Two theories are hypothesized to explain this behavior. First, due to the expansion process associated with releasing gas from a high pressure storage chamber, the gas introduced into the tank in the second set of examples is of much lower temperature than that used in the first set of examples. Thus, in the second set of examples, a significantly greater quantity of energy is required to heat the gas mixture to the dissociation temperature of nitrous oxide. Second, the ITLX ignition cord used in the first set of examples had a significantly greater calorific content than the RDC ignition cord used in the second set of examples. Thus, for the same mass of pyrotechnic material, more energy was released to the stored gas in the first set of examples compared to the second set of examples.

With respect to the timing of the ignition of the pyrotechnic material used to externally dissociate the nitrous oxide, it will be appreciated that the effectiveness of the igniting and burning of the pyrotechnic material will generally be limited if it is ignited prior to a significant amount of gas being present in the airbag cushion. Thus the pyrotechnic material used to externally dissociate the nitrous oxide may generally be ignited anytime after burst disc rupture, as desired. Further, it will be appreciated that the onset of the pressure levels associated with or resulting from the occurring of heating and reaction of the gas source material (e.g., dissociation) can be controlled to occur basically anytime after rupture of the burst disc. As will be appreciated, such adjustability and control can be important and advantageous in various applications such as in adjusting system performance for different crash scenarios, for example.

Example 14

In this example, the inventive inflation system was tested in conjunction with a 13-liter curtain inflatable device airbag cushion. The curtain inflatable device airbag cushion featured a plurality of individual inflatable chambers joined to a common manifold.

The test inflator contained a 35-gram gas mixture consisting of 30% nitrous oxide, 60% argon, and 10% helium (molar basis). The curtain inflatable device airbag cushion contained 72 inches of RDC initiator.

Discussion of Results

Figure 6:
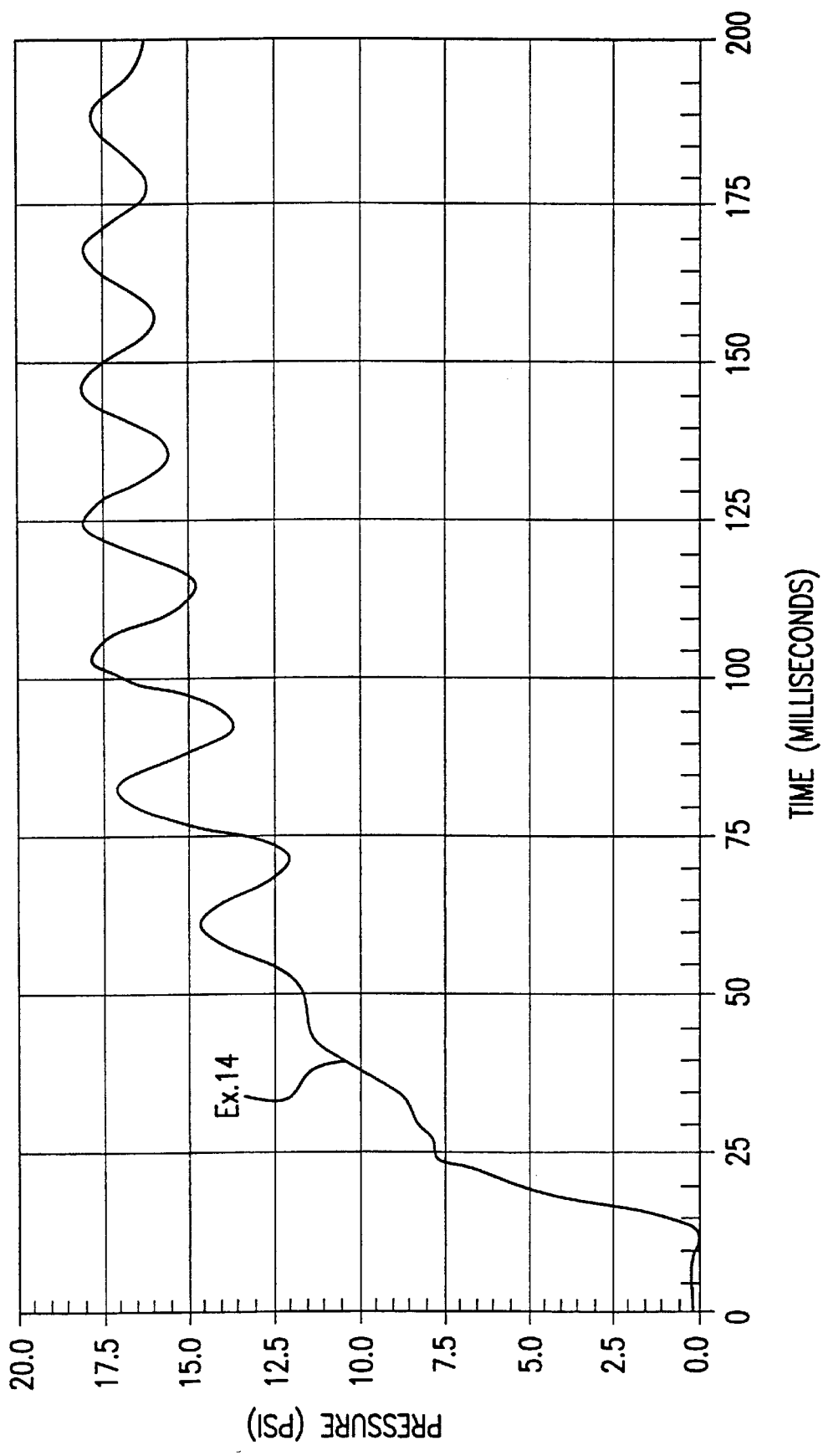
FIG. 6 is a graphical depiction of airbag cushion internal pressure as a function of time performance realized in Example 14.

The results obtained in Example 14 are shown in FIG. 6. Pressure trace oscillations such as shown in FIG. 6 are typical of the inflation of actual airbag cushions.

As shown, there is very little or no pressure within the inflatable airbag cushion until about 15 milliseconds after system actuation. This delay was at least in part attributable to the throttling arrangement used in the experimental arrangement of Example 14. If desired and as is known, the throttle area can be increased such as to provide or achieve a higher or more rapid rise rate.

Positive pressure within the airbag cushion occurred at about 15 milliseconds and increased to about 4.2 psig at about 20 milliseconds post-actuation. At this time in a typical deployment process, the pressure within the associated airbag cushion would normally begin to decrease as inflation gas is slowly vented from the airbag cushion. In the inflation system of Example 14, however, the RDC initiator within the airbag cushion was fired at a time period of 25 milliseconds after system actuation. As shown in FIG. 6, the pressure within the airbag cushion subsequently to dramatically increased. Such pressure increase is, in accordance with the invention, attributable to the heat input provided by the RDC initiator and the resulting dissociation of nitrous oxide to produce additional volume of gas. As shown. the airbag cushion maintained internal pressure until about 200 milliseconds following actuation.

Thus, Example 14 clearly shows that the inventive inflation system works when used in conjunction with an actual airbag cushion. Further, there is a clear increase in performance (e.g., increase in pressure within the associated airbag cushion) due to actuation and firing of an in-bag initiator device. Still further, the timing of performance adaptability (e.g., pressure increase within the associated airbag cushion) can be varied to meet the needs and demands of the specific dynamics of particular crash events or occurrences.

While the invention has been described above relative to embodiments wherein the gas source material storage chamber included one or more gas exit openings with respective closure or closures, it will be appreciated that the broader practice of the invention is not so limited. For example, the gas source material storage chamber may, if desired, be designed or constructed to appropriately open or rupture upon actuation. If desired, the chamber need not include a pre-defined opening. The chamber may, if desired. include a breakline or portion of reduced thickness or strength to facilitate or permit the repeatable opening thereof upon proper actuation.

The invention illustratively disclosed herein suitably may be practiced in the absence of any element, part, step component or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflatable restraint system comprising:
    a chamber which contains at least one gas source material, which material, when initiated, dissociates to form dissociation products including at least one gaseous dissociation product,
    opening means actuatable to open said chamber whereby at least a portion of the at least one gas source material can be expelled from said chamber;
    a plurality of inflatable devices each operatively joined with said chamber whereby, upon opening of said chamber, at least a portion of the at least one gas source material expelled from said chamber is passed into the interior of at least a first selected one of said plurality of inflatable devices;
    at least one first initiator effective, upon actuation, to initiate dissociation of the at least one gas source material within the first selected one of said plurality of inflatable devices; and
    at least one second initiator effective, upon actuation, to initiate dissociation of the at least one gas source material within a second selected one of said plurality of inflatable devices to form dissociation products including the at least one gaseous dissociation product.

2. The system of claim 1 wherein the at least one gas source material comprises nitrous oxide.

3. The system of claim 1 wherein the at least one second initiator and the at least one first initiator differ in at least one design characteristic selected from the group consisting of size, energy output and geometry.

4. The system of claim 1 wherein each of the plurality of inflatable devices operatively joined with said chamber are for the protection of a single vehicle occupant.

5. The system of claim 1 wherein at least one of the plurality of inflatable devices operatively joined with said chamber is positioned remote from said chamber.

6. The system of claim 1 wherein the plurality of inflatable devices comprises at least one curtain inflatable device.

7. The system of claim 1 wherein the plurality of inflatable devices comprises at least one carpet inflatable device.

8. The system of claim 1 wherein the plurality of inflatable devices comprises at least one driver side inflatable device.

9. The system of claim 1 wherein the plurality of inflatable devices comprises at least one passenger side inflatable device.

10. The system of claim 1 wherein the plurality of inflatable devices comprises at least one side impact inflatable device.

11. The system of claim 1 wherein the plurality of inflatable devices comprises at least one curtain inflatable device and at least one side impact inflatable device.

12. The system of claim 1 wherein the plurality of inflatable devices comprises at least one driver side inflatable device and at least one passenger side inflatable device.

13. An inflatable restraint system comprising:
    a chamber having contents including at least a quantity of nitrous oxide,
    opening means actuatable to open said chamber whereby at least a portion of the quantity of nitrous oxide can be released from said chamber;
    a plurality of inflatable devices each operatively joined with said chamber whereby, upon opening of said chamber, the portion of the quantity of nitrous oxide released from said chamber is passed into the interior of at least a first selected one of said plurality of inflatable devices;
    at least one first actuatable initiator situated within the first selected one of said plurality of inflatable devices, said first initiator effective, upon actuation, to initiate dissociation within the first selected one of said plurality of inflatable devices of at least a portion of the quantity of nitrous oxide released from said chamber that comes into contact with said first initiator to form dissociation products which include at least one gaseous dissociation product; and
    at least one second actuatable initiator situated within a second selected one of said plurality of inflatable devices, said second initiator effective, upon actuation, to initiate dissociation of at least a portion of the quantity of nitrous oxide within the second selected one of said plurality of inflatable devices to form dissociation products including the at least one gaseous dissociation product.

14. The system of claim 13 wherein the plurality of inflatable devices comprises at least one driver side inflatable device.

15. The system of claim 13 wherein the plurality of inflatable devices comprises at least one passenger side inflatable device.

16. The system of claim 13 wherein the plurality of inflatable devices comprises at least one side impact inflatable device.

17. The system of claim 13 wherein the plurality of inflatable devices comprises at least one curtain inflatable device.

18. The system of claim 13 wherein the plurality of inflatable devices comprises at least one carpet inflatable device.

19. The system of claim 13 wherein each of the plurality of inflatable devices operatively joined with said chamber are for the protection of a single vehicle occupant.

20. The system of claim 13 wherein at least one of the plurality of inflatable devices is positioned remote from said chamber.

21. The system of claim 13 wherein the at least one second actuatable initiator and the at least one first actuatable initiator differ in at least one design characteristic selected from the group consisting of size, energy output and geometry.

22. The system of claim 13 wherein the plurality of inflatable devices comprises at least one curtain inflatable device and at least one side impact inflatable device.

23. The system of claim 13 wherein the plurality of inflatable devices comprises at least one driver side inflatable device and at least one passenger side inflatable device.

* * * * *